United States Patent
Rakesh et al.

(10) Patent No.: US 8,280,922 B2
(45) Date of Patent: Oct. 2, 2012

(54) USER-INTEREST DRIVEN LAUNCHING PAD OF MOBILE APPLICATION AND METHOD OF OPERATING THE SAME

(75) Inventors: Gupta Rakesh, Karnataka (IN); Reddy Konda Sreenath, Karantaka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 662 days.

(21) Appl. No.: 11/916,129

(22) PCT Filed: May 29, 2007

(86) PCT No.: PCT/KR2007/002609
§ 371 (c)(1),
(2), (4) Date: Nov. 30, 2007

(87) PCT Pub. No.: WO2007/139342
PCT Pub. Date: Dec. 6, 2007

(65) Prior Publication Data
US 2010/0023892 A1    Jan. 28, 2010

(30) Foreign Application Priority Data

May 30, 2006  (IN) ............................ 925/CHE/2006
May 18, 2007  (KR) ........................ 10-2007-0048728

(51) Int. Cl.
*G06F 17/30* (2006.01)

(52) U.S. Cl. ........ 707/805; 707/791; 707/792; 707/793; 707/797; 707/798; 707/799; 707/800; 707/801; 707/803; 707/809; 707/812; 709/204; 709/227; 709/229; 455/518; 370/517

(58) Field of Classification Search .................. 707/791, 707/792, 793, 797, 798, 799, 800, 801, 803, 707/809, 819, 805, 999.102; 709/204, 227, 709/229; 455/518; 370/517
See application file for complete search history.

(56) References Cited

U.S. PATENT DOCUMENTS

2004/0066459 A1 * 4/2004 Fox et al. ................... 348/220.1
2006/0242234 A1 * 10/2006 Counts et al. ................. 709/204

FOREIGN PATENT DOCUMENTS

| CN | 1433546 A | 7/2003 |
|---|---|---|
| JP | 8-288996 A | 11/1996 |
| JP | 10-294781 A | 11/1998 |

OTHER PUBLICATIONS

Office Action dated May 31, 2011 from the Japanese Patent Office in counterpart Japanese Application No. 2009-510898.
Office Action dated Oct. 24, 2011, issued by the State Intellectual Property Office of the People's Republic of China in corresponding Chinese Patent Application No. 200780019774.7.

* cited by examiner

*Primary Examiner* — Syling Yen
(74) *Attorney, Agent, or Firm* — Sughrue Mion, PLLC

(57) ABSTRACT

Provided is a user-interest driven launching pad of a mobile application and method of operating the same. The user-interest driven launching pad inputs metadata of data elements related to a mobile device, forms a set of data elements having the same metadata, marks the set of data elements with user-interest reflecting tags, and executes the mobile application relating to the set of data elements.

26 Claims, 3 Drawing Sheets

USER-INTEREST DRIVEN LAUNCHING PAD OF MOBILE APPLICATION AND METHOD OF OPERATING THE SAME

TECHNICAL FIELD

Apparatuses and methods consistent with present invention relate to the field of telecommunications and apply to a mobile application and user interface (UI) design. The present invention addresses the usability of a mobile device, and more particularly, relates to a user-interest driven launching pad of a mobile application and a method of operating the same.

BACKGROUND ART

There are systems or related art available for defining metadata of data elements on phones, for example, the MPEG standard. Systems store the 'about information' of any data (video, audio, image, etc.) These systems store metadata information on content along with the content, for example, in the form of an exchangeable image file (EXIF) header. The metadata information goes along with the data content. Thus, stored metadata information is common for all users.

Different applications mounted on mobile devices manipulate the metadata in order to perform user-intended tasks. These applications may or may not use the same database for these user-intended tasks. Examples of these applications are phonebooks, Short Message Services (SMSs), Multimedia Messaging Services (MMSs), cameras, file-viewers, etc.

Conventional mobile communication applications address the usability by defining UI guidelines for the respective applications, for example, how to use a left-soft-key for a positive action, how to use a center-select key for an 'OK' action, etc. These UI guidelines are not always uniform across different mobile device manufacturers.

Conventional mobile communication applications provide a static way of classifying the data elements. For example, a phonebook or instant messaging (IM) application may provide a way to configure some entries as 'friends', others as 'relatives', and so on. Camera applications may provide a way of putting photos into different folders.

Advanced mobile phones have a 'search' function implemented with regard to the data elements in phones, for example, GOOGLE Desktop. This search function typically aims at a given text input.

The following are search results for related art in the related fields, and describe how the present invention is different from the related art.

U.S. Patent Application Publication No. 2006/0035632A1 entitled 'Apparatus and Method for Facilitating Contact Selection in Communication Devices' was filed on Aug. 16, 2004. This patent publication provides a method and apparatus for facilitating a contact selection in communication devices. The technique enables monitoring of the communication attributes of a previous communication. A plurality of history lists maintain contacts, which satisfy selection criteria, based on the monitored communication attributes. These history lists enable a user to select an intended contact using minimum keystrokes. The patent publication describes a method of automatically categorizing contacts into multiple categories. However, the patent publication does not describe categorization of data elements other than contacts.

U.S. Pat. No. 7,003,327, entitled 'Heuristically Assisted User Interface for Wireless Communication Device,' was filed on Jun. 14, 2000. The assignee is Openwave Systems Inc. The patent publication provides an apparatus and method for managing contacts in a mobile device. The mobile device assists a user in managing and utilizing contact identifiers such as phone numbers, email addresses, facsimile numbers, uniform resource locators (URLs), etc. Content stored in the mobile device is processed and analyzed for the presence of predetermined classes of contact identifiers. The patent publication further enables the user to automatically undertake a specific task when messages or calls from pre-identified contacts are received. The patent publication provides a user interface for automatically categorizing and managing contact information in the mobile device. However, no information is given on the management of data elements other than contact information.

JP2003219065A entitled 'Mobile Phone and Information Management Method in the Mobile Phone' was filed on Jan. 18, 2002. The Assignee is NEC Access Technica Ltd. Provided is a user interface (UI) by which a user can easily select/search area information and easily perform operations, such as erasure of data of the area information, in a mobile phone with a function of receiving the area information through an area information distribution service. The patent publication describes categorization of information into different directories according to a location or area where the mobile phone operates. However, this patent publication does not describe categorization of data according to user interest and manual or automatic updating of the data.

DISCLOSURE OF INVENTION

Technical Solution

The present invention provides a user-interest driven launching pad of a mobile application in order to more quickly and efficiently access a mobile application relating to a desired mobile device and operate the application, and a method of operating the same. The present invention applies to a mobile application and user interface (UI) design. The present invention addresses the usability of a mobile device. More particularly, the present invention provides an application launching pad for more quickly accessing an application relating to a user-interest driven data element and executing the application, and a method of operating the same.

The present invention also provides a method of providing a data element with a user-interest driven tag in order to reduce a space for storing metadata and to more quickly and efficiently exchange data between different mobile devices.

Advantageous Effects

The user-interest driven launching pad of a mobile application and method of operating the same according to the present invention operate a desired application with fewer command inputs, thereby providing improved usability. A data element, which is related to a user's desired temporary task and executable in a mobile device, can be marked with a tag. The mobile application can be easily executed by using a view of the mobile device.

While a tag is previously used for marking according to a user's general interest, the tag can be generated by the user in order to reflect a user's changing interest. While a data element can be previously marked with a tag, the tag can be read from metadata of a different user's data element and determined.

The metadata is not duplicated for each data element but is marked with the tag, thereby saving storage space. The data element is not physically included in the mobile device but exists over a network. Synchronization of a list of tags and data elements between two mobile devices enables efficient data communication.

DESCRIPTION OF DRAWINGS

The above and other features of the present invention will become more apparent by describing in detail exemplary embodiments thereof with reference to the attached drawings in which.

BEST MODE

Figure 1:
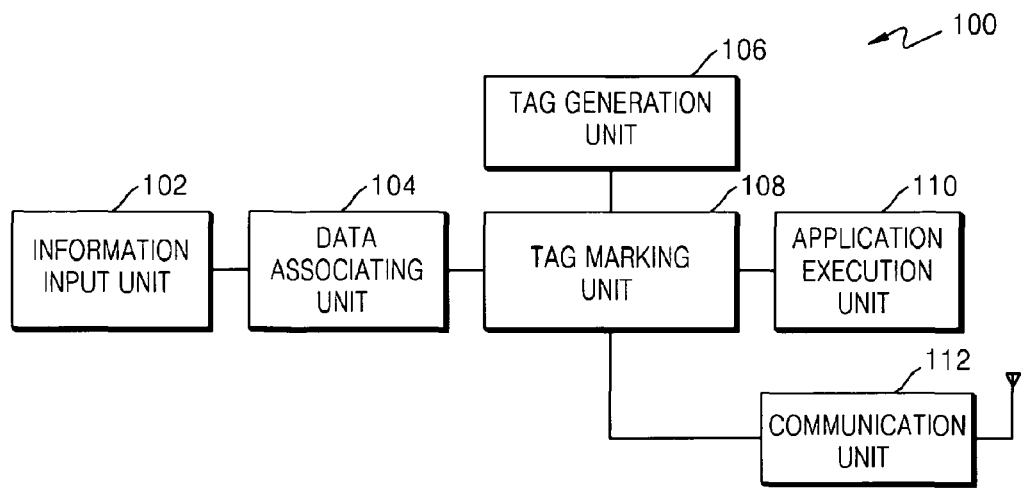
FIG. 1 is a block diagram illustrating a user-interest driven launching pad of a mobile application according to an exemplary embodiment of the present invention.

According to an aspect of the present invention, there is provided a method of operating a user-interest driven launching pad of a mobile application, the method comprising: inputting metadata of data elements relating to a mobile device; forming a set of data elements having the same metadata; marking the set of data elements with user-interest reflecting tags; and executing the mobile application relating to the set of data elements. The marking with the tags may comprise: determining the tags related to the data elements.

The marking with the tags may comprise: marking with a plurality of tags related to the data elements. The tags may be previously generated and can be newly generated. The tags may be in the form of an Extensible Markup Language (XML) file or a text string.

The executing of the mobile application may comprise: if the tags are selected, displaying a list of all data elements related to the tags, and, if at least one data element is selected from the list, executing a mobile application related to the selected data element.

The method may further comprise: forming a list of the tags and sharing the list of the tags with another user through each mobile device. The sharing of the list of the tags may comprise: synchronizing the list of the tags before transmitting the data elements.

The data elements may be included in the mobile device or exist over a network.

The determining of the tags may comprise: reading the data elements and determining the tags based on applications that have been executed with regard to the data elements.

The data elements may be classified into a trigger type or a persistent-type, and may comprise multimedia data, contacts, calendar events, and messages.

According to another aspect of the present invention, there is provided a user-interest driven launching pad of a mobile application comprising: an information input unit inputting metadata of data elements relating to a mobile device; a data associating unit forming a set of data elements having the same metadata; a tag marking unit marking the set of data elements with user-interest reflecting tags; and an application execution unit executing the mobile application related to the set of data elements.

According to another aspect of the present invention, there is provided a computer readable recording medium storing a program for executing a method of operating a user-interest driven launching pad of a mobile application, the method comprising: inputting metadata of data elements relating to a mobile device; forming a set of data elements having the same metadata; marking the set of data elements with user-interest reflecting tags; and executing the mobile application related to the set of data elements.

MODE FOR INVENTION

This application claims the priority of Indian Patent Application No. 925/CHE/2006 filed on May 30, 2006, in Indian Patent Trademark Office, and Korean Patent Application No. 10-2007-0048728 filed on May 18, 2007, the disclosure of which is incorporated herein in its entirety by reference.

Hereinafter, the present invention will be described more fully with reference to the accompanying drawings, in which exemplary embodiments of the invention are shown.

FIG. 1 is a block diagram illustrating a user-interest driven launching pad 100 of a mobile application according to an embodiment of the present invention. Referring to FIG. 1, the user-interest driven launching pad 100 of the mobile application comprises an information input unit 102, a data associating unit 104, a tag generation unit 106, a tag making unit 108, an application execution unit 110, and a communication unit 112.

The information input unit 102 inputs 'about information', which is several pieces of information about data elements, into metadata of data elements in order to execute the mobile application, and outputs the data elements having the metadata to the data combination unit 104.

The metadata, called property information, is provided with content in order to efficiently search for and make use of information of which there is a large amount. The location and context of content, information on an author of the content, conditions of ownership of the content, terms of use of the content, history of use of the content, or the like are recorded on the metadata. The metadata is used to present data and quickly search for data.

The data associating unit 104 analyzes the metadata of the data elements including the 'about information' received from the information input unit 102, associates the data elements having the same metadata to form a plurality of sets of data elements, and outputs the sets of data elements to the tag marking unit 108.

The tag generation unit 106 generates user-interest driven tags and outputs them to the tag marking unit 108.

The present invention is based on the fact that people associate and collect a variety of materials by types, across different aspects of their lives. For example, a user's contact, message, calendar event, photo, or the like are classified into a tag such as 'organizing-dinner' or 'house-hunting', or are mentally tagged.

The tag-based classification of data may be a common factor for all mobile applications. Generally, a specific user does not have a lot of important interests at any one time but the user's important interests keep changing. Therefore, since user-interest reflecting tags are few and keep changing, they need to be updated.

The present invention provides a user-interest driven tag definition in order to classify user-interest driven data elements relating to the mobile application. Therefore, while a tag reflecting a user's general life interest may be previously defined and generated in the mobile communication application, a tag reflecting the user's various interest changes may be defined by a user and generated in the mobile application.

Therefore, if no tag is suitable for the sets of data elements output from the data associating unit 104, the tag generation unit 106 provides a new definition of user-interest tags based on the metadata and generates tags.

The tag marking unit 108 marks each set of data elements with a predetermined tag output from the data associating unit 104, and outputs the tagged sets of data elements to the application execution unit 110. According to another embodiment of the present invention, the tag marking unit 108 determines what tag marks each set of data elements.

Each set of data elements can be marked with a plurality of tags. For example, two tags 'dinner-inviting' and 'homework gathering' can mark a set of data elements 'John Doe'. A tag may be in the form of an Extensible Markup Language (XML) file or a simple row of characters.

The application execution unit 110 executes an application relating to each tagged set of data elements output from the tag marking unit 108. Since a tag may mark a plurality of data elements, selection of the tag can involve selecting the plurality of data elements, and then selection of one of the plurality of data elements can involve executing an application related to the selected data element. Selection of another one of the plurality of data elements involves executing another application related to the another selected data element.

For example, if the tag 'dinner-inviting' is selected, various data elements such as a contact, an appointment schedule, and a received SMS message may be marked with the tag 'dinner-inviting'. If the contact is selected, an application calls the contact. If the appointment schedule is selected, an application administers a schedule table. If the SMS message is selected, an SMS message application responds to the received SMS message.

The communication unit 112 receives a list of tags from the tag marking unit 108, and communicates data of a mobile device and data of another user's mobile device. According to another embodiment of the present invention, the tags are synchronized before both mobile devices communicate their data in order to increase communication efficiency.

Figure 2:
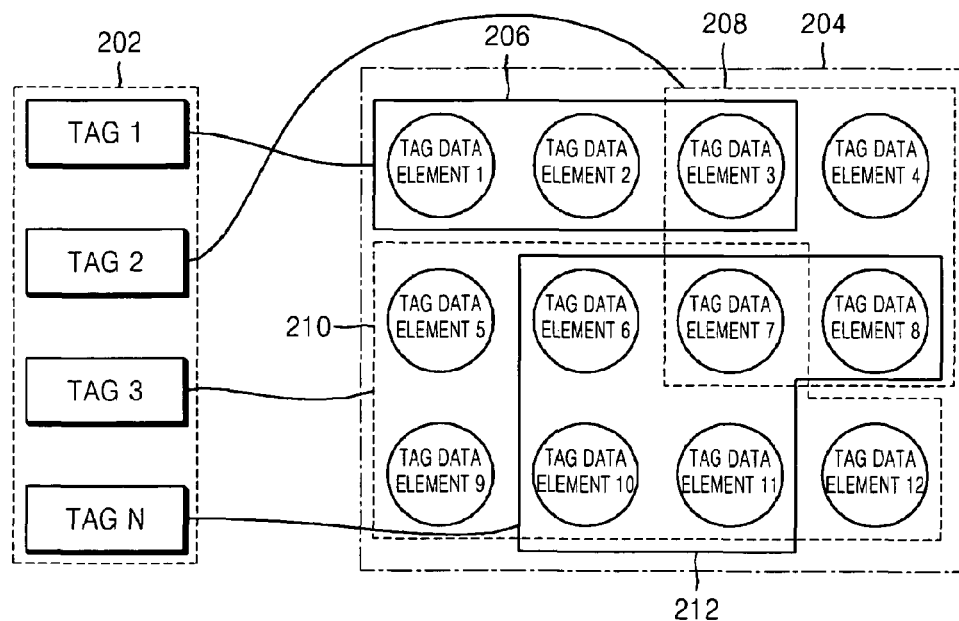
FIG. 2 illustrates a relationship between tags and data elements according to an exemplary embodiment of the present invention.

FIG. 2 illustrates a relationship between tags and data elements according to an embodiment of the present invention. Referring to FIG. 2, a set 202 is a list of tags 1, 2, 3, through to N on a mobile device. Since a user may have a plurality of interests, a plurality of tags reflecting the plurality of user interests may exist on the mobile device.

A set 204 includes all data elements 1 through 12 relating to the mobile device. Although the data elements 1 through 12 are included in the mobile device in the present embodiment, they may exist over a network according to another embodiment of the present invention. The data elements 1 through 12 include multimedia data such as songs, images, photos, etc., contacts such as vcards, calendar events such as schedule, messages and the like.

A plurality of sets 206, 208, 210, and 212 include the data elements 1, 2, and 3, the data elements 3, 4, 7, and 8, the data elements 5, 6, 7, 9, 10, 11, and 12, and the data elements 6, 7, 8, 10, and 11, respectively, which results from the association of data elements having the same metadata in the data associating unit 104. While each of the data elements 1, 2, 4, 5, 9, and 12 is included in one set only, each of the data elements 3, 6, 7, 8, 10, and 11 is included in a plurality of sets.

The set 206 is marked with tag 1, the set 208 is marked with tag 2, the set 210 is marked with tag 3, and the set 212 is marked with tag N, which is performed by the tag marking unit 108. Since each of the data elements 3, 6, 7, 8, 10, and 11 is included in the plurality of sets, the data elements 3, 6, 7, 8, 10, and 11 are marked with a plurality of tags. For example, the data element 3 is marked with the tags 1 and 2, and the data element 7 is marked with the tags 2, 3, and 4.

It may be pre-determined which tag marks a data element. In particular, since a tag reflecting a user's normal interests may have predefined metadata, a predefined tag may mark a data element having metadata input by the data input unit 102 and the tag may be in the form of software.

For example, since data elements such as contacts, calendar events or the like are expected to be marked to a tag 'birthday', the tag and metadata can be predefined in the mobile device. Therefore, the tag 'birthday' is marked to a data element relating to a calendar event 'birthday party date'.

However, since events relating to a variety of user interests occur in a user's real life, it is impossible to mark tags, which are in the form of software, to all data elements predefined in the mobile device. Therefore, according to another embodiment of the present invention, tags can be newly defined and generated, and used to mark data elements by a user's operation.

According to another embodiment of the present invention, a tag determination unit reads data elements and searches for all applications that have been executed with regard to the data elements, so that a history of applications of the data elements can be analyzed to determine tags corresponding to the data elements.

Figure 3:
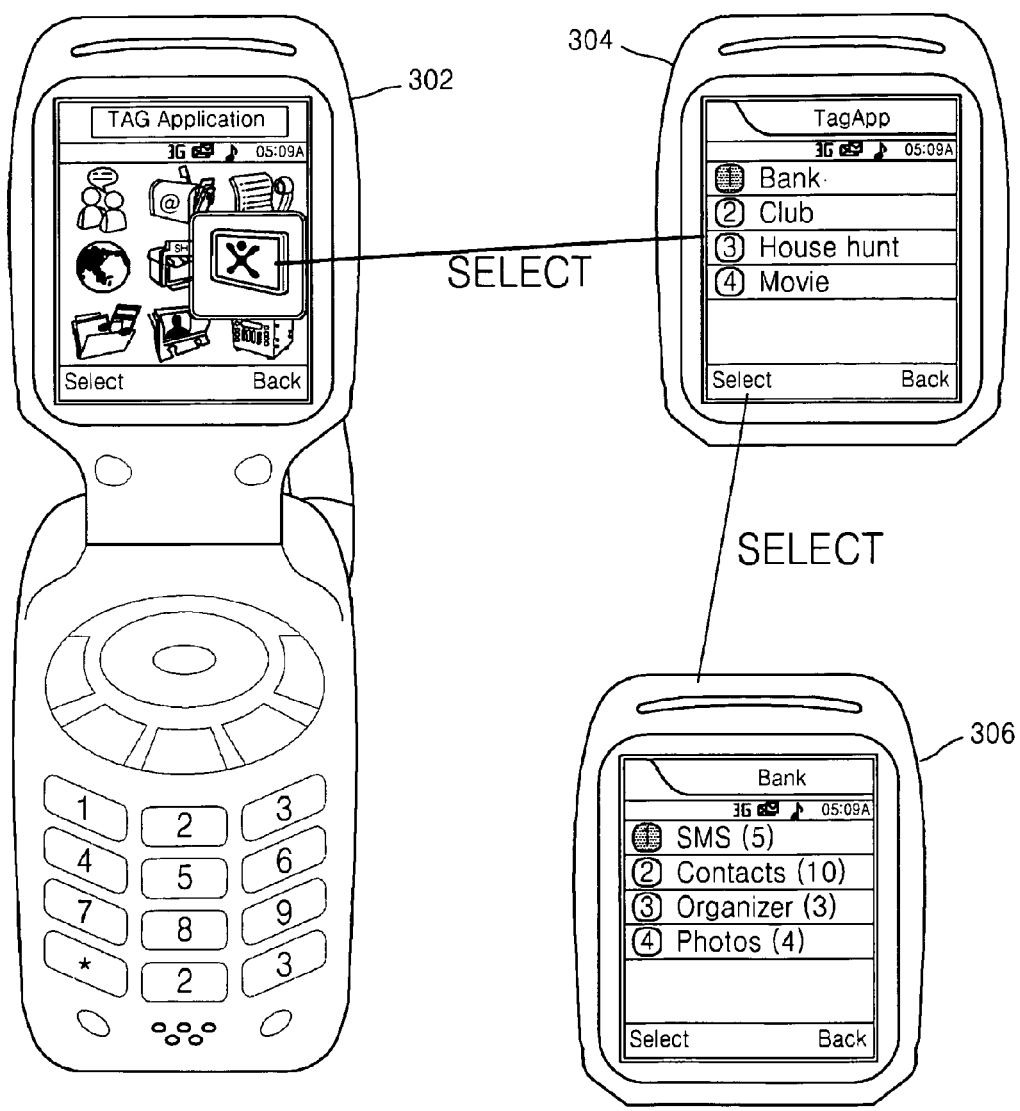
FIG. 3 is a diagram illustrating a launching pad of a mobile device and is for explaining a method of operating the launching pad according to an exemplary embodiment of the present invention.

FIG. 3 is a diagram illustrating a launching pad of a mobile device and is for explaining a method of operating the launching pad according to an embodiment of the present invention. Referring to FIG. 3, in a view 302, a user selects a tag application from a main menu displayed on the mobile device. The view 302 corresponds to a ready step for executing a selected application of the mobile device depending on which tag application menu is selected by the user.

In a view 304, a list, i.e., a menu, of predefined tags is displayed on the tag application that is selected from the main menu of the view 302. The user selects a tag from the list of tags.

In a view 306, a list, i.e., a menu, of data elements marked by the tag selected by the user is displayed. A plurality of data elements including five SMSs, ten contacts, three organizers, and four photos are marked by tag 'bank'. These data elements have the same metadata so that they are marked by the tag 'bank'.

If the user selects two or more data elements, applications relating to the selected data elements are executed. For example, if the user selects the data element 'SMS', an SMS application is executed, if the user selects the data element 'contact', a contact application is executed, if the user selects the data element 'organizer', a schedule administration application is executed, and if the user selects the data element 'photo', a photo viewer application is executed.

How an application relating to the mobile device is executed will now be described in detail.

There is no common thread of usability across conventional applications reflecting user tasks, which are used in the mobile device, except that the conventional art provides the same user interface (UI) guidelines and ability to invoke one application from the other application. For example, it is impossible to invoke a calling application from the SMS viewer application. The user can select an option for making a call to a person who sent the SMS. Although there are ways of organizing data elements within an application based on a user's interests, it is impossible to simultaneously deal with different applications.

A conventional UI of the mobile device does not provide a way of executing an application for a user's temporary interests (for example, 'house-hunting', 'organizing dinner', or 'preparing report', etc) from one screen.

The user's interests can be classified as a 'trigger-type' such as checking weather forecast, seeing a game-score, etc., and a 'persistent-type' such as 'organizing dinner', 'house-hunting', etc. The data elements such as vcards, photos, appointments, etc. included in the latter type of interests are accumulated over a period of time. Users are supposed to determine their favorite tasks, and search for all data units on the mobile device in order to accomplish these tasks. With the increase in the number of applications and the amount of data on/from the mobile device or a phone, the usability and efficiency starts falling.

Conventional applications do not focus on the fact that the user looks at each application or data element in the phone from the same perspective due to the user's temporary tasks/interests, which reduces efficiency in executing an application of a data element.

Therefore, the present invention, as described above, can mark a plurality of data elements, each having a different application, with a tag reflecting a user's interest. Thus, the present invention can execute several applications on a screen of the mobile device displaying a tag, which is different from the conventional invention, thereby increasing efficiency and usability of the launching pad of the mobile device.

Content, storage, duplication, and communication of metadata of a data element related to the mobile device will now be described.

The available metadata frameworks and related task-driven computing solutions are too cumbersome and dull to be usable. Some of them require defining the task in terms of a task description language while capturing the work flow of a task. The metadata in these kinds of frameworks is tied to data, in the form of a header, and is an integral part of the data. The association of the data is conventionally maintained only by and for a specific user The 'about information' that the user associates with a data element can be an XML file. This format of storing the 'about information' saves storage space since the same information is not stored for every data element. For example, if a number of multimedia objects (songs, photos, images, etc), contacts (vcards), calendar events, messages, etc. are based on the same user's interest, the multimedia objects are provided to the same XML file. A set of XML files is indexed in order to avoid the duplication of metadata.

In more detail, the metadata is detailed information which concerns the user, which is not duplicated for each data element. Instead, each data element indexes the metadata in order to avoid the duplication of the about information for every data element, thereby saving storage space for the 'about information'.

Transmission and communication of data elements between two mobile devices or two user's mobile devices are critical and indispensable to telecommunications. However, an increase in the amount of data and the number of transmissions and communications requires efficiency.

In the communication of a data element related to the mobile device, redundancy of metadata deteriorates inefficiency of communication. Therefore, the present invention marks the same set of metadata with a tag, making it possible to avoid the direct duplication of metadata and to communicate data at high speed. Furthermore, the present invention synchronizes tags between two different users, resulting in more efficient and inexpensive communication of data.

Figure 4:
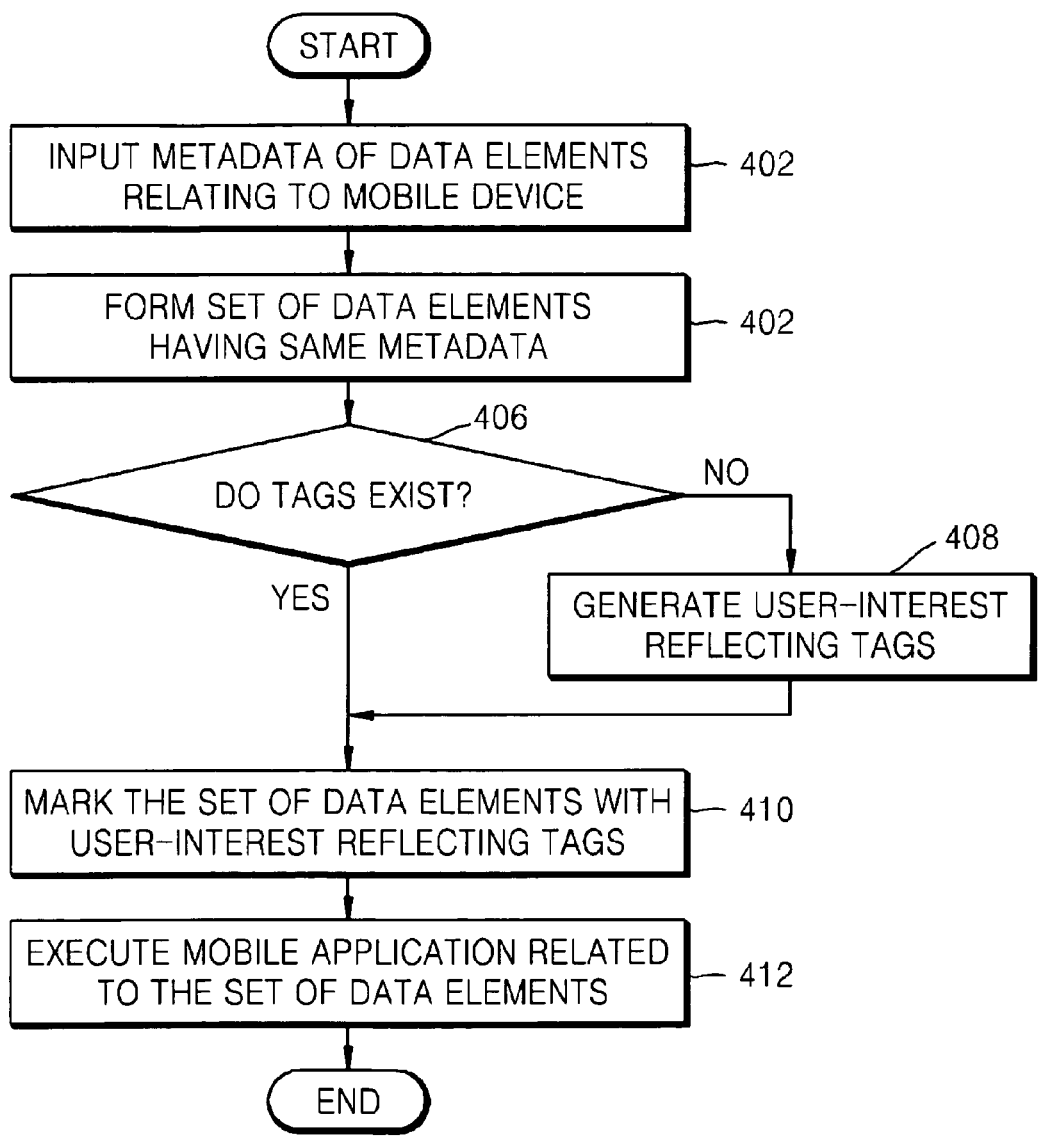
FIG. 4 is a flowchart illustrating a method of operating a user-interest driven launching pad of a mobile application according to an exemplary embodiment of the present invention.

FIG. 4 is a flowchart illustrating a method of operating a user-interest driven launching pad of a mobile application according to an embodiment of the present invention. Referring to FIG. 4, metadata of data elements relating to a mobile device is input (Operation 402).

Data elements having the same input metadata are associated to form a set thereof (Operation 404). Since a data element may have a plurality of pieces of metadata, the data elements having the same metadata are plural.

It is determined whether a suitable tag exists in order to mark the set of data elements with a tag (Operation 406). According to the present embodiment, since the tag reflects a user's interest, a variety of user interests correspond to metadata of the set of data elements, which are to be marked by the tag. Therefore, a tag suitable for the metadata may be previously generated, when no suitable tag exists. If a suitable tag exists, the method proceeds to Operation 410, and if not, the method proceeds to Operation 408.

A new tag is defined and generated in order to mark the set of data elements (Operation 408). According to the present embodiment, the tag needs to reflect the user's interest.

The set of data elements is marked with the suitable tag (Operation 410). A mobile device user confirms the data elements according to the tag with which they are marked and accesses the data elements. Therefore, the user accesses the data elements relating to user interests more quickly and efficiently when executing a related application or communicating the data element with a different mobile device user.

An application related to the set of data elements is executed (Operation 412). If the user selects the tag on the mobile device, the user can access the set of data elements marked with the tag. At this time, if the user selects one of the data elements, an application related to the selected data element is executed. Since the user can confirm all data elements relating to tags reflecting user's interests, several applications relating to several data elements can be more quickly and easily selected and executed.

It will also be obvious to those of ordinary skill in the art that other control methods and apparatuses can be derived from the combinations of the various methods and apparatuses of the present invention as taught by the description and the accompanying drawings and these shall also be considered within the scope of the present invention. Furthermore, descriptions of such combinations and variations are therefore omitted above. It should also be noted that the host for storing the applications include but is not limited to a microchip, microprocessor, handheld communication device, computer, rendering device or a multi function device.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of operating a user-interest driven launching pad of a mobile application, the method comprising:
inputting metadata of a first data element and a second data element relating to a mobile device, wherein the first data element is a type of data used by a first application and the second data element is a type of data used by a second application, wherein the metadata is used to quickly search for data;
forming a set of the first and second data elements having at least a common part of metadata;
marking the set of the first and second data elements with a user-interest tag indicating the common metadata, the user-interest tag corresponding to the first and second data elements being determined by analyzing a history of applications of the first and second data elements;

displaying the set of the first and second data elements by reference to the user-interest tag in response to a first user input selection of the user-interest tag; and executing the first application in response to a second user input selection of the first data element out of the displayed set and the second application in response to the second user input selection of the second data element out of the displayed set.

2. The method of claim 1, wherein the marking comprises determining the user-interest tag related to the set of the first and second data elements.

3. The method of claim 1, wherein the marking comprises marking with the user-interest tag related to the set of the first and second of data elements.

4. The method of claim 1, wherein the user-interest tag is previously generated or newly generated.

5. The method of claim 1, wherein the user-interest tag is in a form of an Extensible Markup Language (XML) file or a text string.

6. The method of claim 1, further comprising:
marking the set of the first and second data elements with a second user-interest tag;
accessing the set of the first and second data elements by reference to the second user-interest tag; and
executing one of the first application in response to a user input selection of the first data element through the second user-interest tag and the second application in response to the user input selection of the second data element through the second user-interest tag.

7. The method of claim 1, further comprising forming a list of the available user-interest tags and sharing the list of the user-interest tags with a second mobile device.

8. The method of claim 7, wherein the sharing of the list of the user-interest tags comprises synchronizing the list of the user-interest tags before transmitting the first and second data elements.

9. The method of claim 1, wherein the plurality of data elements are included in the mobile device or exist over a network.

10. The method of claim 2, wherein the determining the user-interest tag comprises:
reading the first and second data elements and determining the user-interest tag based on the first and second applications that have been executed for the first and second data elements.

11. The method of claim 1, wherein the first and second data elements are classified into a trigger type or a persistent-type.

12. The method of claim 1, wherein the first and second data elements comprise multimedia data, contacts, calendar events, and messages.

13. A mobile device comprising:
a processor, the processor executing a user-interest driven launching pad comprising:
an information input unit which inputs metadata of a first data element and a second data element related to a mobile device, wherein the first data element is a type of data used by a first application and the second data element is a type of data used by a second application, wherein the metadata is used to quickly search for data;
a data associating unit which forms a set of the first and second data elements having at least a common part of metadata;
a tag marking unit which marks the set of the first and second data elements with a user-interest tag indicating the common metadata, the user-interest tag corresponding to the first and second data elements being determined by analyzing a history of applications of the first and second data elements; and
an application execution unit which displays the set of the first and second data elements by reference to the user-interest tag in response to a first user input selection of the user-interest tag and executes the first application in response to a second user input selection of the first data element out of the displayed set and the second application in response to the second user input selection of the second data element out of the displayed set.

14. The mobile device of claim 13, further comprising a tag determination unit which determines the user-interest tag related to the first and second data elements.

15. The mobile device of claim 13, wherein the tag marking unit marks the set of the first and second data elements with the user-interest tag related to the first and second data elements.

16. The mobile device of claim 13, further comprising a tag generation unit which newly defines and generates the user-interest tag.

17. The mobile device of claim 13, wherein the user-interest tag are in a form of an Extensible Markup Language (XML) file or a text string.

18. The mobile device of claim 13, wherein the application execution unit displays a list of all data elements of the set of the first and second data elements related to the user-interest tag.

19. The mobile device of claim 13, further comprising a communication unit which forms a list of available user-interest tags and shares the list of the user-interest tags with a second mobile device.

20. The mobile device of claim 19, wherein the communication unit synchronizes the list of the user-interest tags before transmitting the first and second data elements.

21. The mobile device of claim 13, wherein the plurality of data elements are included in the mobile device or exist over a network.

22. The mobile device of claim 14, wherein the tag determination unit reads the first and second data elements and determines the user-interest tags based on the first and second applications that have been executed for the first and second data elements.

23. The mobile device of claim 13, wherein the first and second data elements are classified into a trigger type or a persistent-type.

24. The mobile device of claim 13, wherein the first and second data elements comprise multimedia data, contacts, calendar events, and messages.

25. A computer readable recording medium storing a program for executing a method of operating a user-interest driven launching pad of a mobile application, the method comprising:
inputting metadata of a first data element and a second data element relating to a mobile device, wherein the first data element is a type of data used by a first application and the second data element is a type of data used by a second application, wherein the metadata is used to quickly search for data;

forming a set of the first and second data elements having at least a common part of metadata;

marking the set of the first and second data elements with a user-interest tag indicating the common metadata, the user-interest tag corresponding to the first and second data elements being determined by analyzing a history of applications of the first and second data elements;

displaying the set of the first and second data elements by reference to the user-interest tag in response to a first user input selection of the user-interest tag; and executing the first application in response to a second user input selection of the first data element out of the displayed set and the second application in response to the second user input selection of the second data element out of the displayed set.

26. The method according to claim 1, wherein the metadata is property information provided with the data and records at least one of a location and context of the data, information on an author of the data, conditions of ownership of the data, terms of use of the data, and history of use of the data.

* * * * *